United States Patent Office 2,806,864
Patented Sept. 17, 1957

2,806,864

4,17(20)-PREGNADIEN-21-AL-20-OL-3,11-DIONE AND ITS ESTERS

Charles M. Smith, Fanwood, N. J., assignor to Merck & Co., Inc., Rahway, N. J., a corporation of New Jersey No Drawing. Application February 16, 1956, Serial No. 565,772

4 Claims. (Cl. 260—397.45)

This invention relates to steroid aldehydes and particularly to 4,17(20)-pregnadien-21-al-20-ol-3,11-dione and derivatives thereof.

The compounds which are the subject of the invention are compounds having the formula

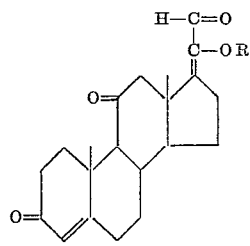

wherein R is hydrogen or

hydrocarbon; and aldehyde addition products thereof. These compounds have been found to possess cortisone-like activity, and can be compounded and utilized in a manner similar to that of cortisone.

The compounds of the invention can be prepared by reacting 4-pregnen-21-al-3,11,20-trione or its hydrate (4-pregnene-21,21-diol-3,11,20-trione) with an enolizing agent to produce 4,17(20)-pregnadien-21-al-20-ol-3,11-dione. This compound can be reacted with acylating agents to produce the corresponding 20-acylates and further reacted to form the 20,21,21-triacylate. The 20-acylates can be produced directly by simultaneously enolizing and acylating the 4-pregnen-21-al-3,11,20-trione or its hydrate. These reactions can be chemically illustrated, as an example when using 4-pregnen-21-ol-3,11,20-trione as the starting material, as follows:

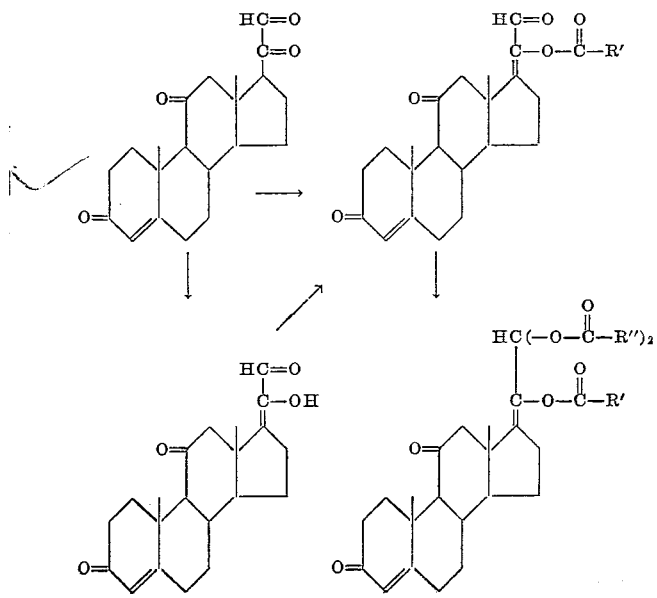

wherein R' and R" are hydrocarbon groups containing less than twelve carbon atoms.

The 4-pregnen-21-al-3,11,20-trione or its hydrate is reacted with an enolizing agent to produce 4,17(20)-pregnadien-21-al-20-ol-3,11-dione. The enolizing agent is preferably a mixture of an organic carboxylic acid and a tertiary-amine. The carboxylic acid is most conveniently a mono-basic organic carboxylic acid containing from one to six carbon atoms. Typical examples of suitable carboxylic acids are acetic acid, propionic acid, butyric acid, valeric acid and caproic acid. The tertiary-amine is preferably a high boiling amine since it simplifies reaction conditions. Examples of suitable tertiary-amines are pyridine, quinoline, the collidines, diethylaniline and dimethylaniline. The tertiary-amine, preferably containing from 5 to 10 carbon atoms, can serve as the reaction medium or the reaction can be carried out in other organic solvents such as aromatic hydrocarbons, chlorinated hydrocarbons and the like as for example dioxane, dimethoxyethane, benzene, toluene and chloroform. The aliphatic carboxylic acid is preferably present in about 20 to 80% by weight, and the tertiary-amine is present in about 20 to 80% by weight. The reaction is preferably carried out at about 20 to 100° C., although higher and lower temperatures can be used. Within this preferred temperature range, with the preferred reactants, the reaction usually requires from a few minutes to four hours for completion. The product can be recovered in any conventional manner, as for example by pouring into ice-cold hydrochloric acid or aqueous sodium bicarbonate and by extracting with an organic solvent such as dichloromethane, trichloromethane and ethylacetate and removing the solvent from the desired product such as by distillation.

The 4,17(20)-pregnadien-21-al-20-ol-3,11-dione is reacted with an acylating agent to produce the corresponding 20-acylate. Suitable acylating agents are organic acid halides such as acid chlorides, organic acid anhydrides, and others with the acid anhydrides being preferred. The acylating agents are preferably those containing from one to eleven carbon atoms inclusive. Typical examples of such acids are formic, acetic, propionic, butyric, valeric, hexanic, heptanic, octanic, carbocyclic acid, such as cyclopentanecarboxylic and cyclopentylpropionic, benzoic, toluic, oxalic and the like. The acids can also contain substituents such as halogen, alkyl, alkoxy and others which are non-reactive under the reaction conditions employed. It is usually preferred to use a large excess of acylating agent of at least two moles and to carry out the reaction in the presence of a tertiary-amine such as pyridine, quinoline, the collidines, diethylaniline, and dimethylaniline. The tertiary-amine can act as the reaction medium or the reaction can be carried out in a suitable solvent such as aromatic hydrocarbon, chlorinated hydrocarbons and the like. The reaction is preferably carried out at a temperature of 20 to 100° C., although higher and lower temperatures can be used. The reaction requires from 8 to 20 hours for completion when using the preferred reaction temperatures and reactants. The product can be recovered in any conventional manner, as for example, by extraction with an organic solvent and then removing the solvent such as by evaporation. Typical examples of the 20-acylates which can be prepared in this manner are the acetate, chloroacetate, propionate, butyrate, tertiary-butylacetate, trimethyl acetate, valerate, hexanate, heptanate, octanate, benzoate, p-methoxybenzoate, phenyl acetate, p-aminobenzoate, hydrocinnamate and hemisuccinimate.

The 4-pregnen-21-al-3,11-dione can be converted to the 20-acylate of 4,17(20)-pregnadien-21-al-20-ol-3,11-dione by simultaneously enolizing and acylating. This is accomplished by combining the enolizing and acylating agents described above in a single reaction medium. As an example, using the preferred reactants, an aliphatic carboxylic acid containing from one to six carbon atoms, an organic acid anhydride and a tertiary-amine are combined and contacted with the 4-pregnen-21-al-3,11,20-trione or its hydrate. This reaction is preferably carried out at a temperature of about 20 to 100° C. At this temperature the reaction usually requires from a few minutes to five hours for completion. The product is recovered in any of the conventional manners such as by extraction with an organic solvent and removing the solvent from the desired product by distillation.

The 20-acylates of 4,17(20)-pregnadien-21-al-20-ol-3,11-dione can be further acylated to form the corresponding 21,21-diacylate. Suitable acylating agents are acid halides such as acid chlorides, acid anhydrides and others with acid anhydric being preferred. The acylating agent preferably contains from one to eleven carbon atoms inclusive. Typical examples of such acids are formic, acetic, propionic, butyric, valeric, hexanic, heptanic, octanic, carbocyclic acids such as, cyclopentanecarboxylic and cyclopentylpropionic, benzoic, toluic, oxalic and the like. The acids can also contain substituents such as halogen, alkyl, alkoxy and others which are nonreactive under the reaction conditions employed. It is usually preferred to use a large excess of acylating agent and to carry out the reaction in the presence of a strong acid such as sulfuric acid, hydrochloric acid or the like. The organic acid anhydride can act as the reaction medium or the reaction can be carried out in a suitable solvent such as aromatic hydrocarbons, chlorinated hydrocarbons and the like. The reaction is preferably carried out at a temperature of 0° C., although higher and lower temperatures can be used. The reaction requires a few minutes for completion when using the preferred reaction temperature and reactants. The product can be recovered in any conventional manner, as for example, by extraction with an organic solvent, and then removing the solvent such as by evaporation. Suitable examples of the acylates which can be prepared in this manner are the acetate, chloracetate, propionate, butyrate, tertiary-butylacetate, trimethyl acetate, valerate, hexanate, heptanate, octanate, benzoate, p-methoxybenzoate, phenyl acetate, p-aminobenzoate, hydrocinnamate and hemisuccinimate. Typical examples of the compounds which can be prepared are 20,21,21-triacetate of 4,17(20)-pregnadien-21-al-20,21,21-triol-3,11-dione; 4,17(20)-pregnadien-21-al-20,21,21-triol-3,11-dione 20-acetate-21,21-dipropionate; 4,17(20)-pregnadien-21-al-20,21,21-triol-3,11-dione 20-acetate-21,21-dibenzoate and 4,17(20)-pregnadien-21-al-20,21,21-triol-3,11-dione-20,21,21-tribenzoate.

The following examples are given for the purposes of illustration:

EXAMPLE 1

*4,17(20)-pregnadien-21-al-20-ol-3,11-dione*

Three hundred milligrams of 4-pregnen-21-al-3,11,20-trione hydrate was dissolved in 1 ml. of pyridine and 1 ml. of acetic acid and heated at 60° C. for two hours. The mixture was poured into ice-2.5 N hydrochloric acid and extracted with methylene chloride several times. The combined extract was washed with dilute hydrochloric acid, aqueous sodium bicarbonate and water. After drying with magnesium sulfate the methylene chloride was distilled off. The residual oil contained about 30% of 4,17(20)-pregnadien-21-al-20-ol-3,11-dione as indicated by the absorption at about 280 mμ.

EXAMPLE 2

*4,17-pregnadien-21-al-20-ol-3,11-dione 20-acetate*

The product prepared in Example 1 was dissolved in 1 ml. of pyridine and 1 ml. of acetic anhydride and kept at room temperature for 15 hours. It was poured into water-methylene chloride, separated, and the methylene chloride layer washed with dilute hydrochloric acid and aqueous sodium bicarbonate, dried and concentrated. The entire residue was chromatographed on silica gel to give the 4,17-pregnadien-21-al-20-ol-3,11-dione 20-acetate. Melting point 226–232° C. Its infrared spectrum contained bands at 5.69, 5.85, 5.98, 6.18 μ.

EXAMPLE 3

*4,17-pregnadien-21-al-20-ol-3,11-dione 20-acetate*

Fifty-four mg. of the hydrate of 4-pregnen-21-al-3,11,20-trione was dissolved in 0.5 cc. pyridine, 0.5 cc. acetic acid and 0.5 cc. acetic anhydride. The mixture was heated at 60° C. for 2.5 hours. It was poured into ice water and extracted with methylene chloride. The methylene chloride was washed with water, dilute hydrochloric acid, aqueous sodium bicarbonate, dried with magnesium sulfate and concentrated. The residue was crystallized with acetone-ether to give 4,17-pregnadien-21-al-20-ol-3,11-dione 20-acetate.

EXAMPLE 4

*0.25% topical ointment of 4,17-pregnadien-21-al-20-ol-3,11-dione 20-acetate*

FORMULA

| | Gram |
|---|---|
| 4,17-pregnadien-21-al-20-ol-3,11-dione 20-acetate | 0.0025 |
| Zinc stearate | 0.0855 |
| Propylene glycol | 0.3070 |
| Carbowax 1500 | 0.3800 |
| Carbowax 4000 | 0.1800 |
| Distilled water | 0.0450 |
| | 1.0000 |

(1) Melt the carbowaxes and with stirring add the propylene glycol, zinc stearate, the steroid and water. (2) Pass the resulting ointment through a roller mill using cold rollers until the ointment is smooth. The resulting ointment is especially suited for dermatologic use.

An 0.5% ointment is prepared by increasing the amount of steroid and proportionately decreasing the amount of zinc stearate in the ointment. Other suitable ointments may be prepared by substituting one of steroids described in the preceding examples.

Any departure from the above description which conforms to the present invention is intended to be included within the scope of the claims.

What is claimed is:

1. Compounds selected from the group consisting of compounds having the formula

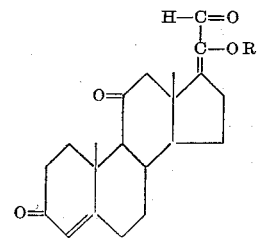

wherein R is selected from the group consisting of hydrogen and

wherein R' is a hydrocarbon group containing less than twelve carbon atoms, and 21,21-diacylates thereof wherein the acyl group has the formula

wherein R" is a hydrocarbon group containing less than twelve carbon atoms.

2. 4,17-pregnadien-21-al-20-ol-3,11-dione.
3. A compound having the formula
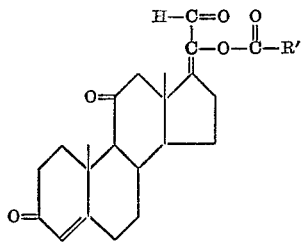
wherein R′ is a hydrocarbon group containing less than twelve carbon atoms.
4. 21 - acetate of 4,17 - pregnadien - 21 - al-20-ol-3,11-dione.
References Cited in the file of this patent
UNITED STATES PATENTS
| | | |
|---|---|---|
| 2,563,247 | Kendall | Aug. 7, 1951 |
| 2,577,018 | Kendall | Dec. 4, 1951 |
| 2,683,153 | Kendall | July 6, 1954 |
| 2,684,376 | Oliveli | July 20, 1954 |
| 2,708,202 | Pfislei | May 10, 1955 |
| 2,732,384 | Beall | Jan. 24, 1956 |